Aug. 16, 1960    B. F. LEWIS ET AL    2,949,507
ELECTRICAL INFORMATION SYSTEM
Filed May 14, 1959
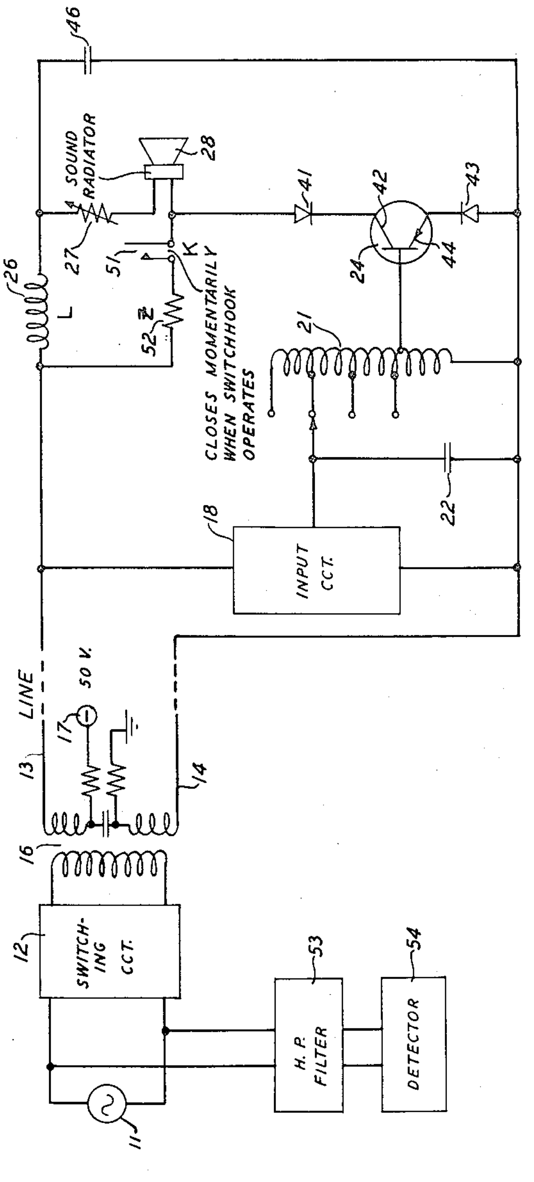
INVENTORS B. F. LEWIS
J. R. POWER
BY
J. R. McCorkendale
ATTORNEY United States Patent Office 2,949,507

Patented Aug. 16, 1960

2,949,507

ELECTRICAL INFORMATION SYSTEM

Benjamin F. Lewis, Bayside, N.Y., and James R. Power, Chatham, N.J., assignors to Bell Telephone Laboratories, Incorporated, New York, N.Y., a corporation of New York Filed May 14, 1959, Ser. No. 813,258

6 Claims. (Cl. 179—84)

This invention relates to telephone systems, and more particularly to a system for detecting "answer" during the ringing intervals on a telephone line equipped with a tone ringer telephone set.

In certain types of telephone systems, such for example, as that described in an article by Mr. A. E. Joel, "An Experimental Switching System Using New Electronic Techniques," Bell System Technical Journal, September 1958, pages 1091–1124, it is the common practice to utilize frequencies within the speech band for "ringing," and to use as the "ringer" at the subscribers' stations a so-called "tone ringer." Further, in these types of systems it is the usual practice to periodically scan the lines to detect various conditions thereon such as "service request," "dialing"; and of particular interest in the present instance, "answer" or receiver off-hook.

One general method of detecting answer which has been previously proposed involves detecting the change in the level of the direct current through the line which occurs during the scanning intervals when the subscriber removes the handset from the cradle; i.e., when the switchhook is closed. However, due largely to the fact that significant changes in the level of the direct current may occur for reasons other than switchhook operation, this method has involved certain complications with regard to the attainment of accurate indications. This is particularly true with regard to detection of answer during the ringing intervals.

An object of the present invention, therefore, is to improve the operation of telephone systems utilizing tone ringer telephone sets.

A more specific object of the invention is to enhance the accuracy of answer detection during the ringing intervals on a telephone line equipped with a tone ringer telephone set.

In accordance with a particular feature of the present invention an alternating-current signal is used for the indication of answer, thereby vastly enhancing the accuracy of the indications as compared with arrangements previously proposed.

In accordance with a specific embodiment of the invention, harmonics of the ringing frequency, which are produced by a transistor at the subscriber's station, are fed back over the line to the central office where they are passed by a high-pass filter and detected to indicate "answer," i.e., "receiver off". A switch which closes momentarily when the switchhook is operated to bridge around the "power" filter at the subscriber's station, is utilized in this circuit.

A full understanding of the arrangement contemplated by the present invention as well as an appreciation of its various advantageous features may be gained from a consideration of the following detailed description in connection with the accompanying drawing.

Referring, now, to the drawing, there is shown in somewhat schematic form the tone ringer circuit at a subscriber's station and a portion of the signaling equipment at the central office. In order to clarify the description of the invention the drawing has been simplified by showing only the selective ringing portions of the circuitry at the subscriber's station to the exclusion of the talking paths. A suitable source of ringing frequencies 11 and the normal switching network 12 of the central office are connected to line conductors 13 and 14 by coupling transformer 16. Direct-current source 17 is also connected to the line at the central office.

At the subscriber's station, the input circuit 18 may include a current limiter of the general type disclosed in United States Patent 2,850,650, issued September 2, 1958, to L. A. Meacham, Transistor Current Limiter. The function of the limiter circuit is to convert the voice frequency signal voltage which may vary for different lines over a range of several volts to a constant-current drive for the frequency-selective elements. Some amplification is also provided by this circuit.

The frequency selective network of the ringer circuit is, in effect, a parallel resonant circuit comprising a coil 21, with adjustable taps, and capacitor 22. The constant current from the input limiter flows through the resonant circuit. At or near resonance the circuit impedance is high and a corresponding high voltage is developed which drives the transistor power amplifier 24.

A direct-current potential for supplying operating power to transistor 24 is applied from source 17, line 13, inductance 26, through volume control 27, the sound radiator 28, diode 41, to transistor collector electrode 42. Biasing diode 43 is included in the return path between emitter electrode 44 of the transistor and line 14.

Alternating-current ringing signals from source 11 at the central office are transmitted over the line, passing through input circuit 18 and a portion of coil 21 depending upon the position of the tap contact. At or near resonance the high voltage which is developed, as pointed out above, drives transistor amplifier 24. Due to the action of biasing diode 43 the transistor circuit operates as a class C amplifier and produces pulses which are rich in harmonics and generate a complex tone in the sound radiator 28. Sound radiator 28 may be of the general type disclosed in United States Patent 2,808,463, issued October 1, 1957, to R. T. Jenkins et al., Telephone Signaling Device. Inductance 26 and capacitor 46, acting as a power supply filter for the amplifier, prevent these pulses from being fed back over line conductors 13 and 14 to the central office.

Diode 41, in series with collector electrode 42 and sound radiator 28, provides "talk-off" protection in a manner fully described in United States Patent 2,873,316, issued February 10, 1959, to J. R. Power, Party Line Lock-Out Circuit.

When the subscriber responds to the calling signal emitted by sound radiator 28 and removes his handset from its cradle, the switchhook (not shown) will, of course, operate in the usual manner to close the line. In accordance with the features of applicants' invention, contacts 51 are added to the normal contact assembly operated by the switchhook. Contacts 51 are arranged to close only momentarily for a period of the order of from 10 to 30 milliseconds as the switchhook operates. It will be apparent that during the short interval of time when contacts 51 are closed a path including impedance 52 is established which bridges around the power filter comprising inductance 26 and capacitor 46. As stated above this power filter normally prevents any feedback over the line of the harmonic-rich pulses being supplied to sound radiator 28. However, during the brief interval when contacts 51 are closed and the bridging circuit is established, harmonics are fed back over the line to the central office where they are passed by high-pass filter 53 and detected by detector 54 to indicate "answer," i.e., "receiver off." High-pass filter 53 preferably has a cutoff well above the tone ringer frequencies produced by source 11, and since the harmonics are higher in frequency than any of the signals produced by source 11 an adequate margin exists against possible interference between the ringing signals transmitted from the central office and the answer indication signal returned thereto from the called station. Further, the fact that an alternating-current signal is utilized for answer indication means, of course, that answer supervision during ringing intervals is entirely independent of the direct-current level and free, therefore, of the frequent inaccurate indications previously resulting. During the silent intervals of the ringing cycle the line may be scanned in the usual manner and "answer" detected by an observed change in the direct-current level as heretofore.

Detector 54 may operate in any desired manner to give indication of answer and its operation will preferably be coordinated with the line scanning elements of the system.

While certain specific embodiments of the invention have been selected for detailed description, the invention is not, of course, limited in its application to the embodiments described. The embodiments which have been described should be taken as illustrative rather than restrictive thereof.

What is claimed is:

1. In a telephone system, a line terminating at one end in a central office and at the other end in a subscriber's station, signaling means at said subscriber's station responsive to current of a particular frequency, means for transmitting current of said particular frequency over said line from said central office to said subscriber's station, a switch at said subscriber's station, means momentarily effective upon operation of said switch for transmitting harmonics of said particular frequency over said line from said subscriber's station to said central office, and means at said central office for detecting said harmonics.

2. In a telephone system, a line terminating at one end in a central office and at the other end in a subscriber's station, means for transmitting a signaling frequency from said central office to said subscriber's station, means at said subscriber's station for producing harmonics of said signaling frequency, a tone producing transducer at said subscriber's station, means for supplying the produced harmonics to said transducer, means for normally preventing the transmission of the harmonics over said line to the central office, a switch at said subscriber's station, means momentarily effective upon operation of said switch for disabling said preventing means thereby to cause transmission of the harmonics over said line to the central office, and means at said central office for detecting said harmonics.

3. In a telephone system, a line terminating at one end in a central office and at the other end in a subscriber's station, a tone producer at said subscriber's station, a source of signaling frequency at said central office, means for transmitting said signaling frequency to said subscriber's station, means at said subscriber's station for producing harmonics of said signaling frequency and for supplying said harmonics to said tone producer, a filter at said subscriber's station effective to prevent transmission of said harmonics over said line to said central office, a switch at said subscriber's station, means for closing said switch momentarily when a call is answered, closing of said switch being effective to bridge said filter and to permit transmission of the harmonics over said line to said central office, and means at said central office for detecting said harmonics.

4. In a telephone system, a line terminating at one end in a central office and at the other end in a subscriber's station, tone producing means at said subscriber's station for indicating a call to said station, a source of signaling frequency at said central office, means for transmitting said signaling frequency to said subscriber's station, means at said subscriber's station responsive to said signaling frequency for producing current pulses containing harmonics of said signaling frequency, means for supplying said pulses to said tone producer, a filter at said subscriber's station for preventing transmission of said pulses over said line to said central office, means momentarily effective upon response to a call to bridge said filter thereby to permit transmission of said pulses over said line to said central office, filtering means at said central office for passing harmonics above a given frequency level, and means for detecting the passed harmonics to provide indication that the call has been responded to.

5. In a telephone system, a line terminating at one end in a central office and at the other end in a subscriber's station, a tone producer at said subscriber's station for indicating a call thereto, a source of signaling frequency at said central office, means for transmitting said signaling frequency to said subscriber's station, means at said subscriber's station responsive to said signaling frequency to produce harmonics thereof, means for supplying said harmonics to said tone producer to cause actuation thereof, means at said subscriber's station for preventing transmission of said harmonics over said line to said central office, means momentarily effective upon response to a call to said subscriber's station for rendering said preventing means ineffective thereby to permit transmission of said harmonics over said line to said central office, and means at said central office responsive to said harmonics to indicate response to said call at said subscriber's station.

6. In a telephone system, a line terminating at one end in a central office and at the other end in a subscriber's station, a tone producer at said subscriber's station for indicating a call thereto, a source of signaling frequency at said central office, means for transmitting said signaling frequency to said subscriber's station, means at said subscriber's station responsive to said signaling frequency to produce harmonics thereof, means for supplying said harmonics to said tone producer to cause actuation thereof, a filter at said subscriber's station for preventing transmission of said harmonics over said line to said central office, a path effective when completed to bridge said filter, means at said subscriber's station effective upon response to a call to momentarily complete said path thereby to permit transmission of said harmonics over said line to said central office, and means at said central office responsive to said harmonics to indicate response to said call.

References Cited in the file of this patent

UNITED STATES PATENTS 1,393,806 Martin ---------------- Oct. 18, 1921